United States Patent
Moradi et al.

(10) Patent No.: US 10,420,132 B2
(45) Date of Patent: Sep. 17, 2019

(54) DEVICES, BASE STATIONS, AND METHODS FOR COMMUNICATING SCHEDULING REQUESTS VIA AN UNDERLAY CONTROL CHANNEL IN A WIRELESS COMMUNICATION SYSTEM

(71) Applicant: Battelle Energy Alliance, LLC, Idaho Falls, ID (US)

(72) Inventors: Hussein Moradi, Idaho Falls, ID (US); Behrouz Farhang, Salt Lake City, UT (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 0 days.

(21) Appl. No.: 15/670,921

(22) Filed: Aug. 7, 2017

(65) Prior Publication Data

US 2018/0049230 A1 Feb. 15, 2018

Related U.S. Application Data

(60) Provisional application No. 62/455,364, filed on Feb. 6, 2017, provisional application No. 62/372,611, filed on Aug. 9, 2016.

(51) Int. Cl.
*H04W 72/04* (2009.01)
*H04W 72/12* (2009.01)
(Continued)

(52) U.S. Cl.
CPC .......... *H04W 72/1278* (2013.01); *H04L 5/14* (2013.01); *H04W 28/0278* (2013.01); *H04W 72/1226* (2013.01); *H04W 72/1231* (2013.01); *H04W 72/14* (2013.01); *H04L 69/324* (2013.01); *H04W 72/1284* (2013.01); *H04W 88/02* (2013.01); *H04W 88/08* (2013.01)

(58) Field of Classification Search
CPC ......... H04W 72/1278; H04W 72/1226; H04W 72/14; H04W 72/1231; H04W 72/1284; H04W 28/0278
See application file for complete search history.

(56) References Cited

U.S. PATENT DOCUMENTS 5,177,765 A 1/1993 Holland et al.
8,731,027 B2 5/2014 Moradi et al.
(Continued)

FOREIGN PATENT DOCUMENTS

CN 1125026 A 6/1996
WO 2015/105702 A1 7/2015

OTHER PUBLICATIONS

3GPP, TR 36.814, v.9.0.0, "Further advancements for E-UTRA physical layer aspects (Release 9)" (Mar. 2010) 107 pages.
(Continued)

*Primary Examiner* — Hassan Kizou
*Assistant Examiner* — Mahbubul Bar Chowdhury
(74) *Attorney, Agent, or Firm* — TraskBritt

(57) ABSTRACT

Wireless communication systems, base stations, and user equipment are disclosed that enable communication of scheduling requests via an underlay control channel that has an energy below a noise level of the spectrum. The scheduling requests may be sent and received at any time, including during downlink and uplink data communication periods of the base station.

19 Claims, 10 Drawing Sheets

(51) Int. Cl.
*H04W 28/02* (2009.01)
*H04L 5/14* (2006.01)
*H04W 72/14* (2009.01)
*H04L 29/08* (2006.01)
*H04W 88/02* (2009.01)
*H04W 88/08* (2009.01)

(56) References Cited

U.S. PATENT DOCUMENTS

| | | |
|---|---|---|
| 8,861,571 B2 | 10/2014 | Moradi et al. |
| 9,369,866 B2 | 6/2016 | Moradi et al. |
| 2005/0058151 A1* | 3/2005 | Yeh .................. H04W 52/46 370/445 |
| 2005/0128935 A1 | 6/2005 | Tang et al. |
| 2008/0225693 A1* | 9/2008 | Zhang ................ H04L 5/023 370/210 |
| 2009/0305716 A1* | 12/2009 | Ono ................ H04W 72/1231 455/452.2 |
| 2011/0242990 A1* | 10/2011 | Simonsson .......... H04W 72/085 370/242 |
| 2013/0064151 A1* | 3/2013 | Mujtaba .............. H04B 7/0817 370/311 |
| 2013/0114518 A1 | 5/2013 | Martin et al. |
| 2013/0157669 A1* | 6/2013 | Turtinen ............. H04W 48/12 455/450 |
| 2014/0098663 A1 | 4/2014 | Vos et al. |
| 2015/0016350 A1* | 1/2015 | Moulsley .......... H04W 72/0453 370/329 |
| 2016/0029407 A1 | 1/2016 | Soldati et al. |
| 2016/0353453 A1 | 12/2016 | Au et al. |
| 2017/0078966 A1 | 3/2017 | Chun et al. |
| 2017/0155443 A1 | 6/2017 | Haziza et al. |
| 2018/0176903 A1* | 6/2018 | Lee ......................... H04L 1/18 |

OTHER PUBLICATIONS

3GPP TR 36.881 v1.0.0, "Study on latency reduction techniques for LTE", (May 2016), 98 pages.
Bharadia et al., "Full-duplex radios", SIGCOMM'13, Hong Kong, China (Aug. 2013) 12 pages.
Lim et. al, "Performance Analysis of Self-Interference Cancellation in Full-Duplex Large—Scale MIMO Systems", arxiv.org (Apr. 2016) 6 pages.
Morelli et al., "A comparison of pilot-aided channel estimation methods for OFDM systems", IEEE Transactions on Signal Processing, vol. 49, No. 12, (Dec. 2001) pp. 3065-3073.
International Search Report for International Application No. PCT/US2017/45951, dated Dec. 4, 2017, 4 pages.
International Written Opinion for International Application No. PCT/US2017/45951, dated Dec. 4, 2017, 6 pages.

* cited by examiner

DEVICES, BASE STATIONS, AND METHODS FOR COMMUNICATING SCHEDULING REQUESTS VIA AN UNDERLAY CONTROL CHANNEL IN A WIRELESS COMMUNICATION SYSTEM

CROSS-REFERENCE TO RELATED APPLICATIONS

This application claims the benefit under 35 U.S.C. § 119(e) of U.S. Provisional Patent Application Ser. No. 62/455,364, filed Feb. 6, 2017, entitled "SYSTEMS, DEVICES, AND METHODS FOR COMMUNICATING SCHEDULING REQUESTS VIA AN UNDERLAY CONTROL CHANNEL IN A WIRELESS COMMUNICATION SYSTEM," and U.S. Provisional Patent Application Ser. No. 62/372,611, filed Aug. 9, 2016, "SYSTEMS, DEVICES, AND METHODS FOR COMMUNICATING SCHEDULING REQUESTS VIA AN UNDERLAY CONTROL CHANNEL IN A WIRELESS COMMUNICATION SYSTEM," the disclosure of each of which is hereby incorporated herein in its entirety by this reference.

STATEMENT REGARDING FEDERALLY SPONSORED RESEARCH OR DEVELOPMENT

This invention was made with government support under Contract No. DE-AC07-05-ID14517 awarded by the United States Department of Energy. The government has certain rights in the invention.

FIELD

Embodiments of the present disclosure relate generally to systems, devices, and methods for communicating scheduling requests by user equipment via an underlay control channel, and receiving, processing, and granting the scheduling request by the base station.

BACKGROUND

There are two conventional approaches for user equipment (UE) initiated uplink (UL) transmission in a wireless system. In one approach the UE may transmit a scheduling-request (SR) to the base station (BS), and in response the base station allocates UL resources and then informs the UE about the allocated UL resources by transmitting a UL grant signal to the UE. This type of UL resource allocation may be referred to as "scheduled-based UL access" (also referred to as the "scheduled-based method" or a "grant-based method"). In a second approach, the UE may transmit its data signals within an assigned set of UL resources that is pre-defined by the base station. This type of UL access may be referred to as "grant-free UL access" (also referred to as the "grant-free method").

There is a trade-off between latency and resource utilization efficiency in both the grant-free method and the scheduled-based method. In the grant-free method, a pre-defined amount of resources is allocated with a pre-defined periodicity. This type of allocation may have lower latency with a cost of resource under-utilization if the UEs do not have anything to transmit. On the other hand, the scheduled-based method may improve the resource-utilization efficiency with a cost of higher latency as it takes multiple time-slots to receive the UL grants at the UE. As a consequence, both of these conventional methods may not be satisfactory for delay-sensitive applications (e.g., critical industrial control, remote surgical robots, etc.) or other applications. These applications are generically referred to as "ultra reliable low latency communication" (URLLC) in the industry.

BRIEF SUMMARY

In some embodiments, a user equipment device is configured to generate a scheduling request (SR) signal and transmit the SR signal to a base station via an underlay control channel below a noise level for a communication spectrum, and generate data packets and transmit the data packets to the base station over an overlay channel above the noise level for the communication spectrum.

In some embodiments, a base station is configured to communicate uplink data and downlink data with a user equipment using active sub-carriers of a spectrum, and communicate scheduling requests with the user equipment using an underlay control channel below a noise level of the spectrum.

In some embodiments, a method comprises sending a scheduling request from a user equipment to a base station via an underlay control channel below a noise level of a spectrum, receiving the scheduling request by the base station, and transmitting a scheduling request grant from the base station to the user equipment, wherein receiving the scheduling request and transmitting the scheduling request are performed in parallel with other data communication between the base station and other user equipment.

DETAILED DESCRIPTION

Figure 1:
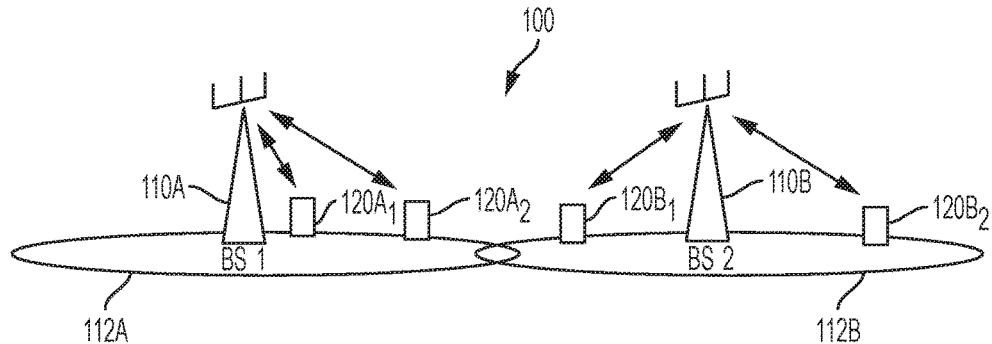
FIG. 1 is a schematic diagram of a wireless communication system.

In the following description, reference is made to the accompanying drawings in which are shown, by way of illustration, specific embodiments in which the disclosure may be practiced. The embodiments are intended to describe aspects of the disclosure in sufficient detail to enable those skilled in the art to make, use, and otherwise practice the disclosure. Furthermore, specific implementations shown and described are only examples and should not be construed as the only way to implement the present disclosure unless specified otherwise herein. It will be readily apparent to one of ordinary skill in the art that the various embodiments of the present disclosure may be practiced by numerous other partitioning solutions. Other embodiments may be utilized and changes may be made to the disclosed embodiments without departing from the scope of the disclosure. The following detailed description is not to be taken in a limiting sense, and the scope of the present invention is defined only by the appended claims.

In the following description, elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths, and the present disclosure may be implemented on any number of data signals including a single data signal.

The various illustrative logical blocks, modules, and circuits described in connection with the embodiments disclosed herein may be implemented or performed with a general purpose processor, a special purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A general-purpose processor may be considered a special-purpose processor while the general-purpose processor executes instructions (e.g., software code) stored on a computer-readable medium. A processor may also be implemented as a combination of computing devices, e.g., a combination of a DSP and a microprocessor, a plurality of microprocessors, one or more microprocessors in conjunction with a DSP core, or any other such configuration.

Also, it is noted that embodiments may be described in terms of a process that may be depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc. Furthermore, the methods disclosed herein may be implemented in hardware, software, or both. If implemented in software, the functions may be stored or transmitted as one or more instructions or code on computer-readable media. Computer-readable media include both computer storage media and communication media, including any medium that facilitates transfer of a computer program from one place to another.

It should be understood that any reference to an element herein using a designation such as "first," "second," and so forth, does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may comprise one or more elements.

Embodiments of the disclosure include systems, devices, and methods in which UEs use an underlay channel to send a scheduling request to a base station, which may result in reduced latency over conventional methods. Some embodiments may be included within a time division duplex (TDD) network deployment scenario. Other embodiments may be included within a frequency division duplex (FDD) deployments scenario. Embodiments are also contemplated to be incorporated with various wireless communication standards including 4G LTE, 5G, and other future standards, as well as machine-to-machine type communications, Internet of Things (IoT) applications, and other related applications.

Headings are included herein to aid in locating certain sections of detailed description. These headings should not be considered to limit the scope of the concepts described under any specific heading. Furthermore, concepts described in any specific heading are generally applicable in other sections throughout the entire specification.

Deployment Scenario

FIG. 1 is a schematic diagram of a wireless communication system 100 according to an embodiment of the disclosure. The wireless communication system 100 includes a first base station 110A having a first coverage area 112A that provides wireless communication services for UEs $120A_1$, $120A_2$. The wireless communication system 100 also includes a second base station 110B having a second coverage area 112B that provides wireless communication services for UEs $120B_1$, $120B_2$. In some embodiments, UEs $120A_1$, $120A_2$, UEs $120B_1$, $120B_2$ may operate in half-duplex mode, and the base stations 110A, 110B may operate in the full-duplex (FD) mode with self-interference cancellation capabilities. Each of the base stations 110A, 110B and the UEs 120A₁, 120A₂, 120B₁, 120B₂ may include components such as one or more processors, transmitters, receivers, memory, etc., configured to enable each device to perform the functions described herein.

Figure 2:
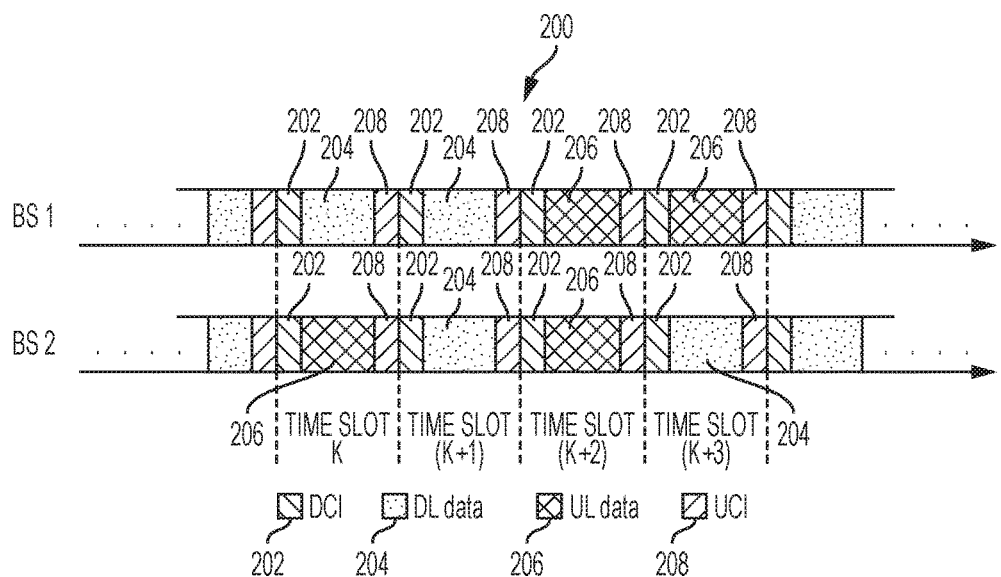
FIG. 2 shows data streams for different base stations and one or more UEs according to a conventional multi-cell synchronized TDD deployment.

FIG. 2 shows data streams 200 for different base stations (e.g., BS1, BS2) and one or more UEs according to a conventional multi-cell synchronized TDD deployment having time slots k, k+1, k+2, k+3, and so on. At the beginning of each time-slot, each base station transmits its downlink control information (DCI) 202 to the UEs within its coverage area. Each base station may then transmit either downlink (DL) data 204 or receive uplink (UL) data 206 from the associated UEs, after which the base station receives UL control information (UCI) 208 from the UEs. Each of the DCI 202, DL data 204, UL data 206, and UCI 208 are multiple users access channels.

Figure 3:
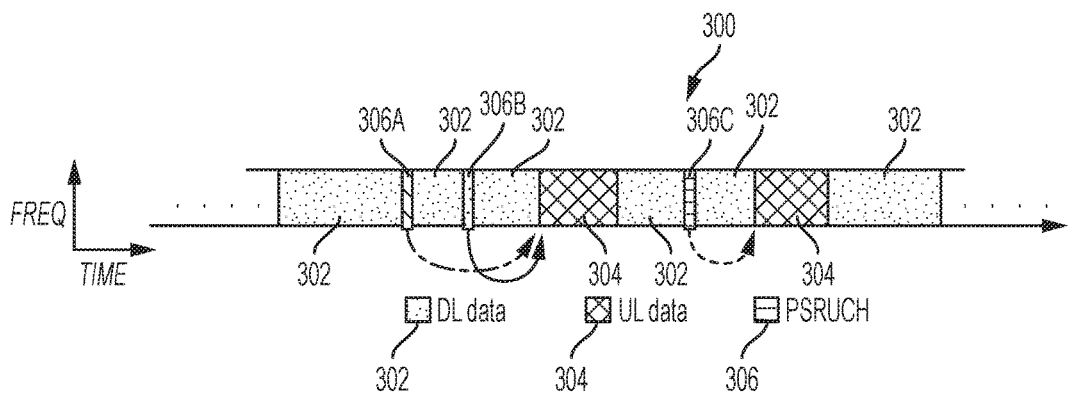
FIG. 3 shows data streams between a base station and one or more UE, according to embodiments of the disclosure.

FIG. 3 shows data streams 300 between a base station and one or more UE according to embodiments of the disclosure. In particular, the embodiment of FIG. 3 shows a dynamic TDD deployment in which the UEs interested in transmitting UL data to the base station transmit a scheduling-request (SR) signal 306A, 306B, 306C to the base station during the DL data 302 or UL data 304 time-slots. The SR signals 306A, 306B, 306C may be non-orthogonal multiple access underlay control channel (UCC) based signals. Throughout the disclosure, this UCC-based SR signal may be referred to as PSRUCH (Physical Layer Scheduling-Request Underlay Channel) 306. In some embodiments, the UCC may be always on coexisting with the overlay signals (e.g., active band) available for communicating SR signals. As a result, there does not need to be any assignment of resources by the base station in order to make a scheduling request. Receiving and granting scheduling requests may be done in parallel with other communications rather than in sequence, which may reduce latency in setting up data communication between the UE and the base station.

In some embodiments, the UCC may use the entire UCC bandwidth by using a spread spectrum signaling method described in U.S. Pat. No. 8,731,027, issued May 20, 2014, U.S. Pat. No. 8,861,571, issued Oct. 14, 2014, and U.S. Pat. No. 9,369,866, issued Jun. 14, 2016, the entire disclosure of each which is incorporated herein by this reference. Other underlay signaling methods are also contemplated in embodiments of the disclosure.

Referring again to FIG. 3, the UEs may transmit the SR signals 306A, 306B, 306C using PSRUCH communications such that they are received at the base station below the noise level. The SR signals 306A, 306B, 306C may contain control information, such as buffer status, priority, power-headroom, etc., related to the data packets to be transmitted by the UEs. The serving base station decodes the SR signals 306A, 306B, 306C and uses the information to schedule the UEs in the upcoming time-slots. Based on the number of SR signals 306A, 306B, 306C being transmitted, the base station may have the flexibility to adapt by deferring some of the delay-tolerant scheduled UL transmissions and allocate UL resources and transmit UL grants in response to the received SR signals 306A, 306B, 306C.

A dedicated common control channel is available for the SR signals; however, as mentioned earlier, a dynamic resource allocation scheme may provide a capability to access resources "on-demand" in order to meet the latency requirements. PSRUCH may offer that capability in a more efficient manner by not requiring any dedicated resources and providing an "always-on" availability for the contention-based SR transmissions, allowing the UEs to access UL resources with very low latency and signaling overhead.

While embodiments described herein primarily refer to TDD deployments, it should be recognized that FDD deployments are also contemplated in embodiments of the disclosure. In some FDD deployments, PSRUCH may be applied only in the uplink carrier to provide the benefits as in the TDD deployment scenario. FD operation mode may transmit and receive simultaneously on a common carrier, in comparison with half duplex mode where transmission and reception occur in different time-slots on a common carrier. In some embodiments, Transmit Receive Points (TRPs) with the base station controller in the network cloud may also be used for deployment scenarios.

Figure 4:
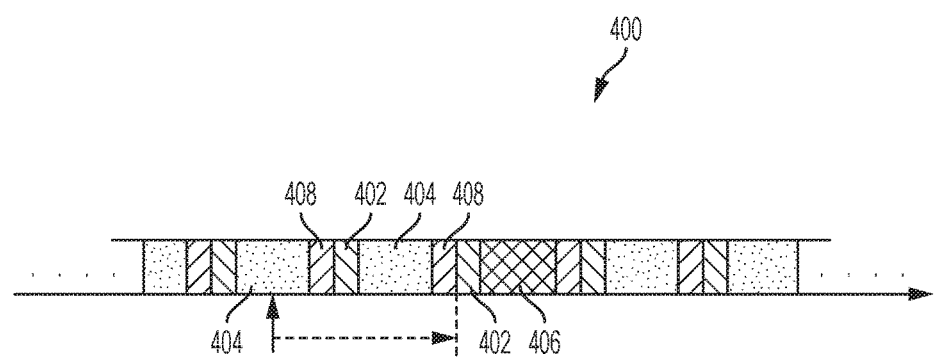
FIGS. 4 and 5 show data streams to illustrate UE initiated data transmissions timeline comparisons between the conventional approach and embodiments of the disclosure.
Figure 5:
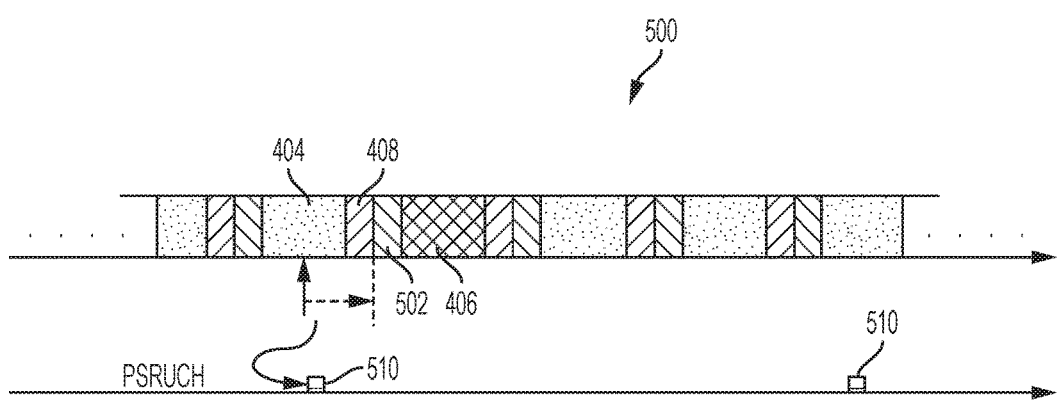

FIGS. 4 and 5 show data streams 400, 500 to illustrate UE initiated data transmissions timeline comparisons between the conventional approach (FIG. 4) and embodiments of the disclosure (FIG. 5). According to Table 1 below, the SR-related latency in the UL is the dominant component of the total delay using conventional methods.

TABLE 1

| Component | Description | Time (ms) |
|---|---|---|
| 1 | Average waiting time for PUCCH - Physical Uplink Control Channel - (10 ms/1 ms SR period) | 5/0.5 |
| 2 | UE sends Scheduling Request on PUCCH | 1 |
| 3 | Base station decodes SR and generates the Scheduling Grant | 3 |
| 4 | Transmission of the Scheduling Grant | 1 |
| 5 | UE processing Delay (decoding of scheduling grant + L1 encoding of UL data) | 3 |
| 6 | Transmission of UL data | 1 |
| 7 | Data decoding in base station | 3 |
|  | Total delay (ms) | 17/12.5 |

As shown in FIG. 4, in order to send an SR the UE must wait for an SR-valid UL resource 408 at the end of a time slot. This wait time after initial data arrival during DL data 404, on average, could vary from 0.5 ms to 5 ms assuming 1 ms and 10 ms SR resource periods, respectively. The base station may then decode and generate the scheduling grant an entire time slot later when it sends its DCI 402 transmission before UL data 406 may be sent.

On the other hand, as shown in FIG. 5, sending SR signals 510 over PSRUCH enables the UEs to transmit SR signals 510 immediately after data arrival such that in response the base station can transmit the corresponding UL grants in the very next DCI 502 transmission. This scheme may reduce the average waiting time to almost zero for the UE to transmit its SR signal 510 after data arrival and also reduces the delay uncertainty.

The UE initiated data transmissions using PSRUCH may be desirable for delay-sensitive type data transmissions requiring low latency and flexibility in data formats. On the other hand, conventional scheduling-based schemes and the grant-free UE transmissions may be operable for the delay-tolerant scheduled and small-packet size type data transmissions, respectively.

Interference Analysis
PSRUCH Transmissions During the Transmission of the Control Information Channels The delivery of the DCI and UCI should be reliable and robust. Therefore, it is desirable that interference avoidance is achieved during the DCI and UCI transmissions. As a consequence, the PSRUCH transmissions may not be allowed during the transmission of the DCI. However, during UCI, PSRUCH transmission may be allowed. This is because with a reasonable power control, PSRUCH may be guaranteed to remain below the noise floor of the UCI signals received at the base station.

PSRUCH Transmissions During the Downlink Data Transmissions

Figure 6A:
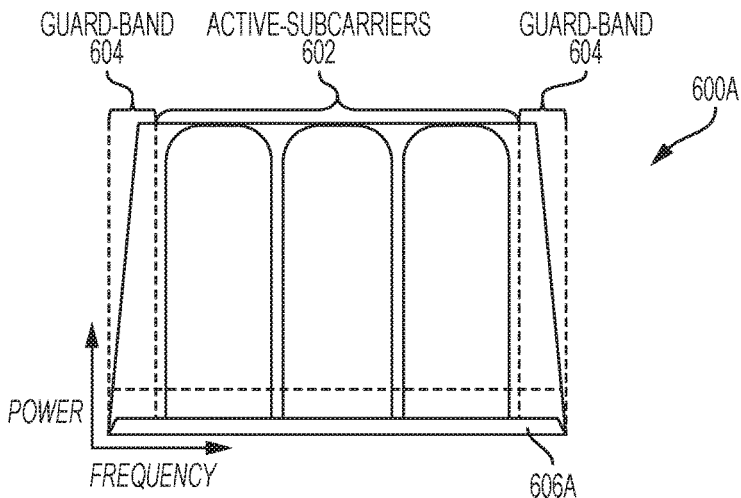
FIGS. 6A, 6B, and 6C show graphs that illustrate three options for transmitting an SR signal while the base station is transmitting downlink data to the UEs.
Figure 6B:
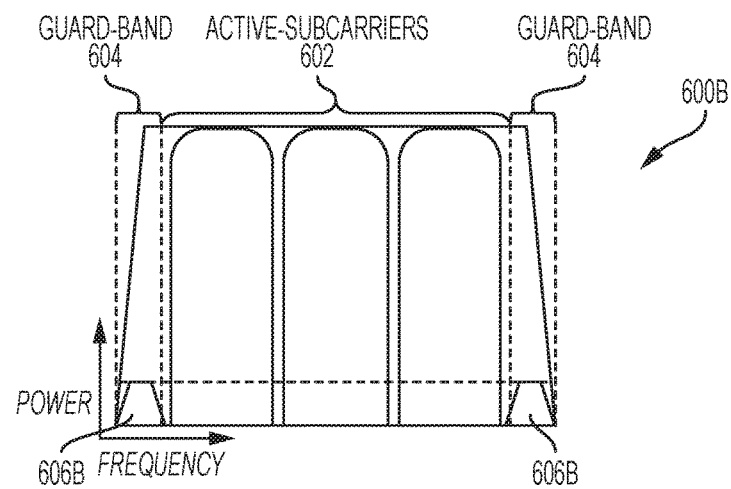
Figure 6C:
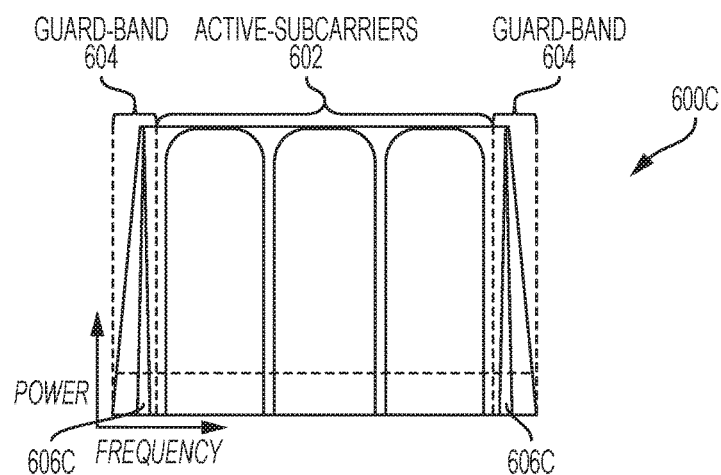

Scheduling cannot be used without some interference to the downlink transmissions because SR signals are random transmissions using PSRUCH. FIGS. 6A, 6B, 6C show graphs 600A, 600B, 600C that illustrate three options for transmitting an SR signal while the base station is transmitting downlink data to the UEs.

FIG. 6A shows UCC signals 606A including the SR signals being spread over the entire bandwidth of active subcarriers 602 and a guard band 604 as part of the UCC below the noise level. FIG. 6B shows UCC signals 606B including the SR signals being spread over a more limited portion of the bandwidth of the spectrum (e.g., confined to be within the guard bands 604) but still as part of the UCC below the noise level. By being limited to the guard bands 604, the power used to transmit the UCC signals 606B may be greater, if desired, than the power of the UCC signals 606A of FIG. 6A that are spread across the entire bandwidth. FIG. 6C show transmission of signals 606C as a narrowband signal within the guard bands 604. This situation may not be desirable for asynchronous contention-based uplink signals, such as the scheduling-request signals or in some cases where guard bands 604 may not be available (e.g., guard bands used for LTE NB-IoT Rel-13 based services, etc.).

Figure 7:
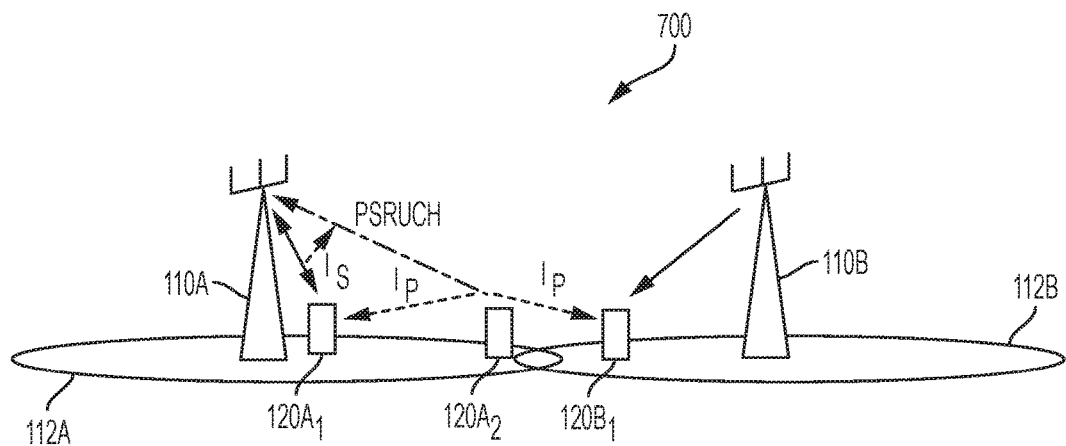
FIG. 7 is a wireless communication system illustrating an example for interference caused by a nearby UE transmitting an SR signal while another UE is receiving the downlink data signal.

FIG. 7 is a wireless communication system 700 illustrating an example for interference $I_P$ caused by a nearby UE (e.g., UE 120A$_2$) transmitting an SR signal while another UE (e.g., UE 120A$_1$, 120B$_1$) is receiving the downlink data signal. Interference $I_s$ is the self-interference. In order to reduce interference, power control and various spreading techniques may be considered to keep the SR signals below the noise level at the receivers (e.g., by using a long PN-code sequence spread along both time and frequency). With such well-spread signals the interference caused by the far-off UEs transmitting SR signals via PSRUCH may be substantially mitigated due to the propagation-loss. However, some of the UEs may not be able to decode their respective DL signal in the presence of a nearby UE transmitting an SR request. In this case, the base station 110 may schedule a hybrid automatic repeat request (HARQ) retransmission of the DL data signal to the specific UEs that were unable to decode the prior received DL data transmissions. HARQ retransmissions may be reduced to an acceptable level by proper spreading of the SR signal over a sufficiently large number of subcarriers and across time.

Power control may be applied to the PSRUCH transmissions of the SR signals such that the SR signals reach the base station 110 receiver at below the noise level. In addition, if needed, the self-interference $I_s$ may be suppressed using various interference cancellation schemes known in the art. Both the power control and the self-interference suppression may contribute to detecting and decoding the received PSRUCH signals at the base station 110.

PSRUCH Transmissions During the Uplink Data Transmissions

At both the serving and the non-serving base station receivers the PSRUCH signals are received below the noise-level causing no significant interference. After demodulating the uplink data signals, the serving base station receiver simply de-spread the PSRUCH signals to obtain the scheduling-request information. Note PSRUCH has an advantage compared to the conventional uplink control SR signaling such as the LTE PUCCH because PSRUCH requires no spectrum fragmentation, no dedicated resources and it is always available to the UEs.

Probability of Collision of SR Signal with Downlink Data Signal at a Nearby UE

To show the collisions of PSRUCH with downlink signals has a low probability, here, we analyze a simplified network to confirm that such collisions have low probability of occurrence.

Figure 8:
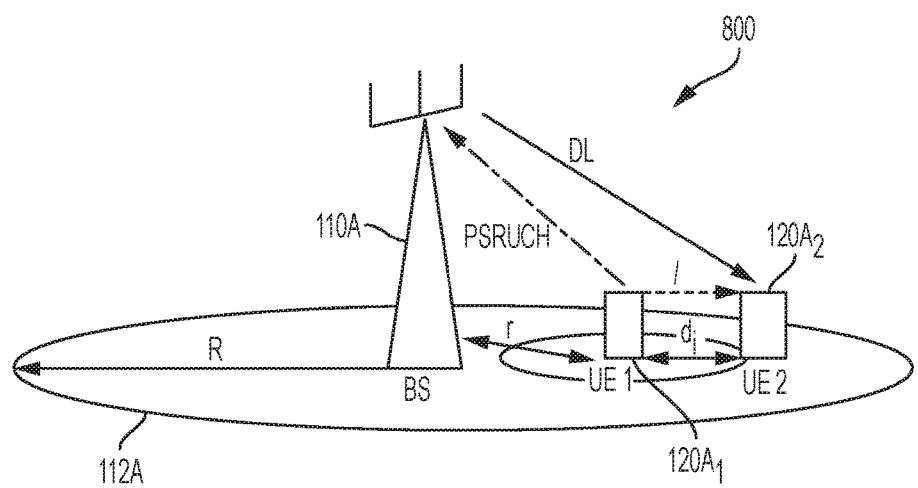
FIG. 8 is a wireless communication system illustrating a scenario for calculating the probability of collision between an SR signal and a downlink data signal.

FIG. 8 is a wireless communication system 800 illustrating a scenario for calculating the probability of collision between PSRUCH and a downlink data signal. A single cell of the wireless communication system 800 is shown in which the base station 110A (also referred to as "BS") at the center of the first coverage area 112A. The first user equipment 120A$_1$ (also referred to as "UE$_1$") is transmitting a PSRUCH signal. At the same time, a second UE 120A$_2$ (also referred to as "UE$_2$") is receiving a DL signal from the base station 110A. When the PSRUCH signal has a destructive interference (I) with the DL signal at the second UE 120A$_2$, a collision has occurred.

The channel additive noise is assumed to originate mostly from the thermal noise. For the first base station 110A, which is operating in a full duplex mode, it is assumed a well-designed interference cancellation is deployed. ρ may be used to denote the power spectral density (PSD) of the channel noise. It is assumed that power control is used to determine the PSD of all the transmit signals. For normal UL and DL signals, the PSD of the received signals is assumed to be α dB above the noise level. For the PSRUCH signal, the PSD of the received signals is assumed to be β dB below the noise level. The PSRUCH signal will collide with the DL signal at the second UE 120A$_2$, if it introduces interference at a level γ dB or greater less than the DL received signal. To simplify the calculations here, only the line-of-sight (LOS) path loss is considered for all the communications and use the following equations:

$$P_{loss} = (89.5 + 16.9 \log_{10} d) \text{ dB} \quad (1)$$

where d is the distance between the transmitter and receiver.

To proceed, r may be used to denote the distance between the base station 110A and the first UE 120A$_1$ and d$_i$ to denote the distance between the UEs 120A$_1$, 120A$_2$. Following the statements made above for different signal levels:

$$\text{PSD of PSRUCH signal at BS} = \rho - \beta \text{ dBm} \quad (2)$$

Using Equation (2) and considering Equation (1):

$$PSD \text{ of } PSRUCH \text{ signal at } UE_2 = \rho - \beta - 16.9\log_{10}\frac{d_i}{r - d_i} \text{ dBm} \quad (3)$$

and:

$$\text{PSD of DL signal at UE}_2 = \rho + \alpha \text{ dBm.} \quad (4)$$

A collision may occur at UE$_2$ when:

$$\text{PSD of DL signal at UE}_2 - \text{PSD of PSRUCH signal at UE}_2 \leq \gamma. \quad (5)$$

Using Equations (3) and (4) in (5), and assuming that d$_i$<<r:

$$\alpha + \beta + 16.9\log_{10}\frac{d_i}{r} \leq \gamma \quad (6)$$

Rearranging Equation (6) results in:

$$d_i \leq \eta r \quad (7)$$

where:

$$\eta = 10^{\frac{\gamma-\alpha-\beta}{16.9}} \quad (8)$$

The above results tell us a collision occurs when $UE_2$ is within a disk of radius $\eta r$ from $UE_1$. Assuming that $UE_1$ and $UE_2$ are uniformly distributed over a cell disk with the radius of R, the probability of $UE_1$ being at a distance r from the center of the cell is obtained as:

$$p(r) = \frac{2\pi r}{\int_0^R 2\pi r dr} = \frac{2r}{R^2} \quad (9)$$

Using this result, the average area of the collision disk (the disk with the radius $\eta r$) is obtained as:

Average area of the collision disk=$\int_0^R \pi(\eta r)^2 p(r) dr = \pi \eta^2 R^2$ (10)

Dividing this average area by the total area of the cell, $\pi R^2$, leads to:

Collision Probability=$\eta^2$

To give a sense of how small or large is this probability of collision, consider the case where $\alpha$=20 dB, $\beta$=10 dB, and $\gamma$=10 dB. For this scenario, we get collision probability=0.0043. This is a very small probability and, thus, quite acceptable in a network with HARQ capability.

Embodiments of the present disclosure may also use PSRUCH for paging applications. Paging is an occasional and periodic transmission that is often used by the base station to inform UEs within its coverage area of changes in the network. During the paging periods (also referred to as "paging occasions"), the UEs that are in IDLE state (e.g., sleep mode) temporarily wake up and listen to the paging channel. If the UE detects its own identity in the received information then the UE processes the corresponding downlink paging message and the scheduling information to set itself up to receive the assigned data channel. Otherwise, if the UE is not paged, the UE may return to its IDLE state until the next paging occasion or other usage.

Using PSRUCH, the base station may page its UEs using an UCC. In such an embodiment, the underlay paging channel may be transmitted using either of underlay transmission options FIG. 6A or FIG. 6B while the UEs transmit the uplink data signals. One advantage of this paging scheme is the base station may not be required to allocate predefined resources for the paging channel. The underlay transmission of the page via the underlay communication channel may also require full-duplex capable UEs because some UEs may be transmitting an uplink signal while receiving the page from the base station.

Additional examples for implementation of the UCC SR channel are presented and evaluated below. It should be understood, however, that the following implementations described herein are non-limiting examples, and that additional variations of UCC SR channels are contemplated and within the scope of the disclosure.

First Example of UCC SR Channel: An OFDM Signaling Method

Embodiments of the disclosure include a packet format for UCC SR channel. In some embodiments, OFDM signaling may be employed as in LTE with similar subcarrier spacing. As an example, a subcarrier spacing of 15 kHz and a bandwidth of 18 MHz available for UCC transmission may accommodate 1200 subcarriers. Each SR packet may include two OFDM symbols. The first OFDM symbol may be used for channel estimation and carry pilot symbols. The first OFDM symbol may be shared among a number of users (e.g., K users). In such a case, a subset of subcarriers may be allocated to each user for channel estimation. For example, if K=3 users share the same OFDM symbol for channel estimation, subcarrier numbers 1, 4, 7, . . . may be allocated to user one, subcarrier numbers 2, 5, 8, . . . may be allocated to user 2, and subcarrier numbers 3, 6, 9, . . . may be allocated to user 3. The second OFDM symbol of each user may be used to carry the information bits of that user.

Figure 9:
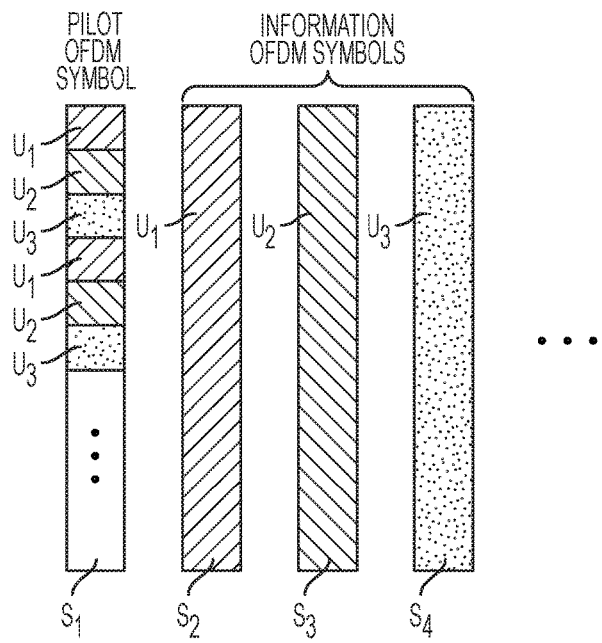
FIG. 9 illustrates subcarriers for SR signaling having a packet format according to an embodiment of the presented disclosure.

FIG. 9 illustrates subcarriers for SR signaling having a packet format according to an embodiment of the present disclosure. In this example, three users $U_1$, $U_2$, $U_3$ share one OFDM symbol for channel estimation, and each user $U_1$, $U_2$, $U_3$ may be assigned one OFDM symbol for information transmission. As shown in FIG. 9, four OFDM symbols $S_1$, $S_2$, $S_3$, and $S_4$ are used to serve users $U_1$, $U_2$, $U_3$. OFDM symbol $S_1$ may be used to transmit pilot symbols from each of the three users. OFDM symbol $S_2$ may be used to transmit information from the first user $U_1$. OFDM symbol $S_3$ may be used to transmit information from the second user $U_2$. OFDM symbol $S_4$ may be used to transmit information symbols from the third user $U_3$.

In some embodiments, each OFDM information symbol may carry a total of 12 uncoded bits. These 12 bits may be expanded to 36 coded bits and mapped to 18 QPSK symbols. Each QPSK symbol may be spread across $$\frac{1200}{18} \approx 16$$

subcarriers that are spaced out across the full bandwidth of 18 MHz. For coding, a rate ⅓ convolutional code may be used, similar to transmission of control information (PUCCH/PUSCH) in LTE.

UEs may be carrier and time synchronized with the base station. As a result, the cyclic prefix striped samples of the OFDM symbols $S_1$, $S_2$, $S_3$, and $S_4$ are available to the receiver (e.g., base station) for processing. Channel estimation may be performed using the maximum likelihood estimator (MLE) as described in M. Morelli and U. Mengali, "A comparison of pilot-aided channel estimation methods for OFDM systems," in IEEE Transactions on Signal Processing, vol. 49, no. 12, pp. 3065-3073, December 2001, the disclosure of which is hereby incorporated herein in its entirety by this reference. The estimated channel may be used for despreading of the demodulated data symbols through a set of maximum ratio combiners. The results of this stage may be passed to a Viterbi decoder for information recovery.

Figure 10:
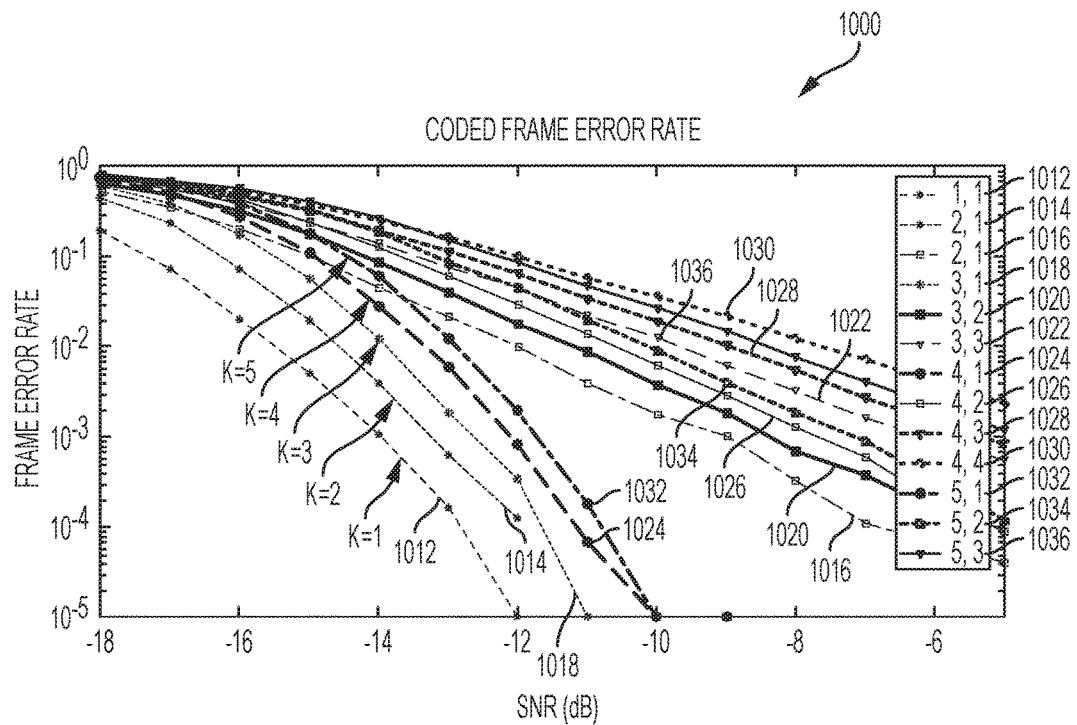
FIG. 10 is a graph presenting a packet error rate (PER) as a function of the receiver input signal-to-noise ratio (SNR) according to an embodiment of the present disclosure.

FIG. 10 is a set of graphs 1000 presenting the frame error rates (FERs) as a function of the receiver input signal-to-noise ratio (SNR) according to an embodiment of the present disclosure. The channel noise may be Gaussian white noise. The FERs are presented in FIG. 10 for different choices of the parameter K (number of users). As seen, when one user (i.e., K=1) fully uses one OFDM symbol for channel estimation and uses one OFDM symbol for information transmission, a FER of lower than $10^{-2}$ at SNR of −15 dB may be achieved as shown by curve 1012. This means more than 99% of SR packets may be successfully decoded when the SR packets are transmitted at a level −15 dB below the signal activities in the channel.

FIG. 10 shows additional cases where multi-users share the same OFDM for channel estimation and different OFDM symbols for data transmission as discussed above and visualized in FIG. 9. The FERs for the case of K=2, 3, 4, and 5 users are curves 1014, 1018, 1024, 1032. As seen, for these cases, a performance loss of about 1 dB may be achieved when K is incremented by one unit. Other cases presented in FIG. 10 include the situation in which multi-users share the same OFDM symbol for channel estimation and more than one OFDM symbols are shared for data transmissions. For instance, the case (3, 2) shown by curve 1020 means three users share one OFDM symbol for channel estimation and two OFDM symbols are shared for transmissions of the data of the three users. In such cases a multiuser technique is used for joint detection of the information of the users.

Second Example of UCC SR Channel: On/Off Keying Using ZC Sequences

Embodiments of the present disclosure may include an on/off keying technique configured to send a single-bit of information from a transmitter (e.g., mobile terminal) to receiver (e.g., a base station). By using each bit with a given signature (i.e., a spreading gain vector) to transmit information to the base station, a variety of messages may be transmitted by multiple UEs by employing a sufficient number of spreading gain vectors. Each information bit may include a distinct spreading gain vector.

The number of single-bit messages that may be transmitted varies with the available resources. Some limitations may be imposed by the channel and the target signal to interference plus noise ratio (SINR) that are needed for reliable transmission. Embodiments of the disclosure may include an on/off keying method that includes Zadoff-Chu (ZC) sequences in time domain as spreading gain vectors is a direct sequence spread spectrum system. The ZC sequences, as further explained below, may allow construction of different message signals with guaranteed no inter-message interference, even in the presence of a channel. Transmission of multiple messages from the same UE may be permitted. Therefore, the SR messages sent from one user may imply a different request, for example, to send SR messages for different packet sizes. If three packet sizes are used, each UE may be assigned three different ZC sequences. In that case, the transmission of each of the three ZC sequences may imply SR messages for one of the three packet sizes.

Certain properties of the ZC sequences may be used to develop a signaling method for the desired on/off keying method. A relatively large number of independent on/off keying bits (e.g., in the order of 20 to 50 bits) may be transmitted within each OFDM symbol while the orthogonality of the respective bits may be within a satisfactory approximation. That is, the bits may be transmitted without substantial interference with each other. Given that in each subframe there may be 7 OFDM symbols, this method allows transmission of 140 to 350 independent bits in each subframe. If each UE is assigned 3 bits, this method may support up to $$\frac{350}{3} \approx 120 \; UEs.$$

In case shorter subframes are adopted (e.g., mini-subframes each carrying two OFDM symbols), some embodiments may be limited to support a smaller number of UEs. Conversely, a larger number of UEs may be supported for embodiments in which longer subframes are adopted. In some embodiments, a much larger number of UEs may be served through a signaling method in which each bit is transmitted twice. An example of such an embodiment is discussed below in the section "ON/OFF Keying Continued: Receiver Implementation and Theoretical Results (CSI unknown)." In particular, three variations of the receiver implementation are discussed below under the subsections "First Detector," "Second Detector," and "Third Detector," as non-limiting examples of receivers that may be implemented according to embodiments of the disclosure.

As an example, a ZC sequence of length N may be represented by the column vector:

$$z_0 = \begin{bmatrix} z_0 \\ z_1 \\ z_2 \\ \vdots \\ z_{N-1} \end{bmatrix} \quad (12)$$

The circularly shifted versions of $z_0$ may be defined as $z_1, z_2, \ldots, z_{N-1}$:

$$z_1 = \begin{bmatrix} z_{N-1} \\ z_0 \\ z_1 \\ \vdots \\ z_{N-2} \end{bmatrix}, z_2 = \begin{bmatrix} z_{N-2} \\ z_{N-1} \\ z_0 \\ \vdots \\ z_{N-3} \end{bmatrix}, \ldots, z_{N-1} = \begin{bmatrix} z_1 \\ z_2 \\ z_3 \\ \vdots \\ z_0 \end{bmatrix} \quad (13)$$

The on/off keying method may build upon the following property of the ZC sequences. The vectors $z_0, z_1, z_2, \ldots, z_{N-1}$ are orthogonal to each other. As a result, for all values of i and j:

$$z_i^H z_j = 0 \text{ for any } i \neq j, \quad (14)$$

where the superscript H denotes Hermitian (i.e., conjugate transpose).

To transmit an SR bit, a ZC sequence vector $z_i$ may be treated as the spreading gain vector of a CDMA transmitter (i.e., form a direct sequence spread spectrum (DS-SS) signal), and accordingly transmit a single bit b=+1. Moreover, to allow orthogonality of different bits, the CDMA method implemented may be CP-CDMA. In other words, cyclic prefix (CP) is added to each CDMA symbol.

Figure 11:
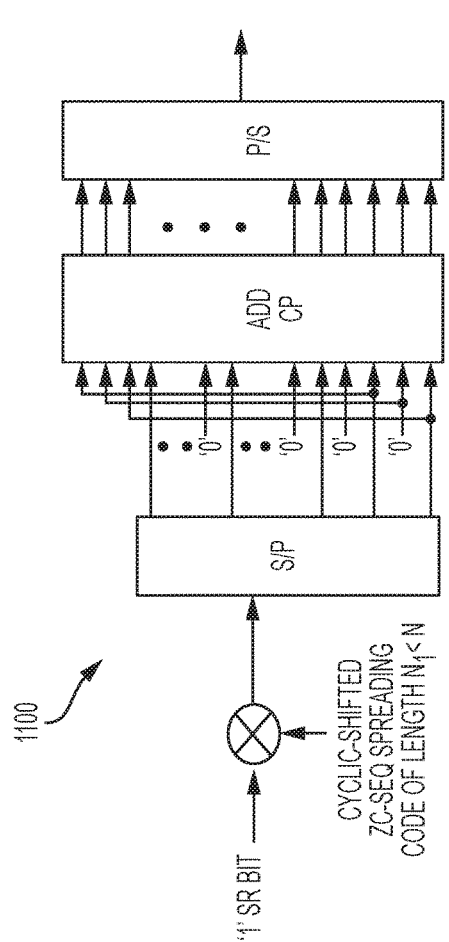
FIG. 11 is a simplified block diagram of the transmitter according to an embodiment of the disclosure.

FIG. 11 is a simplified block diagram of a transmitter 1100 according to an embodiment of the disclosure. The transmitter 1100 may be configured to transmit a DS-SS signal pre-pended with a cyclic prefix. As shown in FIG. 11, the CP-assisted DS-SS signal is generated such that it will be aligned with the OFDM symbols within the respective cell. In other words, the DS-SS signals that are adopted are compatible with OFDM signals within the network, thus, can benefit from any synchronization that has been adopted. The spreading sequence is a cyclic-shifted ZC-sequence. Different numbers of shifts may be applied for each bit to assure orthogonality of the signals associated with different UEs or different bits that are associated with the same UE. A subset of M cyclic-shifted sequences out of total N cyclic-shifted versions of the root ZC-sequence are assigned to each UE if there are M different sizes of uplink transmission formats available. For example, in the URLLC case, three different uplink transmission format sizes (e.g., 32, 50, 200 bytes) may be considered. Accordingly, three cyclic-shifted ZC-sequences may be assigned to a UE.

In addition, to allow simple synchronization of the transmitted SR bits within a network, each CDMA bit may have the same length as the OFDM symbols in the network, and the generated CP-CDMA bits are time-aligned with the OFDM symbols. To develop the background theory that enables the orthogonality of the SR bits, without any loss of generality, the ZC sequence $z_i$ is transmitted as an SR message. After passing through the channel, and removing the cyclic prefix at the receiver, the received signal vector may be:

$$x_i = Z_i h_i \quad (15)$$

where $h_i$ is a vector of length L representing the channel impulse response and $Z_i$ is a matrix of size N×L and with the columns $z_i, z_{i+1}, \ldots, z_{i+L-1}$. If another bit is sent simultaneously with the spreading gain vector $z_j$, the respective received signal may be:

$$x_j = Z_j h_j \quad (16)$$

Recalling the orthogonality property of Equation (14), when |i−j|>L, the received signal vectors $x_i$ and $x_j$ are orthogonal to each other, i.e., $x_i^H x_j = 0$.

Within each OFDM symbol, it is possible to transmit up to N/L bits, from a single UE or from different UEs, without interfering with one another. With seven OFDM symbols within each downlink subframe, a total of $$\frac{7N}{L}$$

bits may be transmitted over each subframe. We also note that the value of L that enables inter-bit interference free transmission may be equal to the length of the cyclic prefix. In other words, the cyclic prefix length may be set equal to L. With a typical cyclic prefix length of 7% of the OFDM symbol length N, $$\frac{7N}{L} = \frac{7N}{0.07N} = 100$$

UEs can transmit their underlay SR signals per subframe-duration without interfering with each other. As a result, within each OFDM subframe, 100 inter-bit interference free bits may be transmitted.

Furthermore, typical channel responses have usually relatively long low energy tails. As a result, L (i.e., the spacing between ZC sequences) may be half of the cyclic prefix length or smaller at a cost of introducing a small amount of inter-bit interference. Moreover, because only a small subset of UEs transmit SR message in a given subframe, the chance of presence of such interference is relatively low and, thus, one may argue for further reduction of the parameter L. Reducing L will allow SR services be expanded to a larger number of UEs, or a larger number of bits may be transmitted by each user. Although the parameter L may be made smaller than the cyclic prefix to serve a larger number of UEs in some embodiments, for purposes of discussion, it is assumed herein that L is equal to CP length to simplify the discussion.

ON/OFF Keying Continued: Receiver Implementation and Theoretical Results (CSI Known)

Analysis and numerical results that are presented in this section may not achievable in practice as channel state information (CSI) is unknown in practice and its estimation may require some resources and are not perfect. Hence, the disclosure serves to demonstrate a potential upper limit to the performance of at least some of the embodiments of the disclosure.

As an example, in the scenario with two UEs in the network, the received signal x within one OFDM time frame may be:

$$x = b_i x_i + b_{j1} x_j + n \quad (17)$$

where $b_i$ and $b_j$ are the transmitted bits and n represents other signal activities (including channel noise) within the transmission band.

Assuming that $x_i$ and $x_j$ are known (i.e., $Z_i$ and $Z_j$ and the respective channel impulse responses $h_i$ and $h_j$ are known), and the elements of n are a set of independent and identically distributed (i.i.d.) random variables, the detectors for estimation of $b_i$ and $b_j$ may a pair of matched filters expressed as:

$$d_i = x_i^H x \quad (18)$$

and $$d_j = x_j^H x. \quad (19)$$

Such detectors may not be practical for implementation, as $h_i$ and $h_1$ may be unknown to the receiver. Also, in practice, the elements of n may not be independent. However, understanding of the performance of detectors like Equation (18) and Equation (19) still may be of interest, as they provide some intuition to what one should expect from a good detector. For this detector, next, its processing gain is evaluated.

Processing Gain of the Detector

Consider the detector represented by Equation (18). Substituting Equation (17) in Equation (18) and recalling that $x_i^H x_j = 0$, the detector may be represented as:

$$d_i = b_i x_i^H x_i + x_i^H n \quad (20)$$

Because $d_i$ is independent of the signal part that carries $b_1$ and recalling (18), for the UE that has transmitted $b_i$, we define the SNR at the receiver input as:

$$SNR_i = \frac{x_i^H x_i}{E[n^H n]} = \frac{h_i^H Z_i^H Z_i h_i}{N\sigma_n^2} \quad (21)$$

where $\sigma_n^2$ is the variance of the elements of n. Assuming that the ZC vectors are normalized to the length of unity, Equation (21) may be simplified as:

$$SNR_i = \frac{h_i^H h_i}{N\sigma_n^2}. \quad (22)$$

At the detector output, Equation (20) implies that the magnitude of the detected bit has the known energy $x_i^H x_i = h_i^H h_i$. The product $h_i^H h_i$ may be a constant independent of the channel $h_i$, which implies that the bit power at the detector output (assuming that a bit has been transmitted) is equal to $(h_i^H h_i)^2$. On the other hand, the noise power at the detector output may be obtained by evaluating $$\frac{1}{2}E[x_i^H nn^H x_i].$$

In this example, a factor of ½ has been added because the detected bits are real-valued and, hence, only the real part of the noise at the detector output may be accounted.

When the elements of n are samples of a white noise, $$\frac{1}{2}E[x_i^H nn^H x_i] = \frac{1}{2}\sigma_n^2 h_i^H h_i$$

and, thus, the SNR at the detector output is obtained as:

$$SNR_o = \frac{(h_i^H h_i)^2}{\frac{1}{2}\sigma_n^2 h_i^H h_i} = \frac{2(h_i^H h_i)}{\sigma_n^2} = 2N \times SNR_i. \quad (23)$$

Equation (23) shows a processing gain of 2N. When the elements of n are samples of a bandlimited process, Equation (23) may be modified. In spread spectrum systems, in general, the processing gain varies with the bandwidth. Thus, when the elements of n are samples of a process that is spread over a fraction β of the full band, the processing gain 2N reduces to 2βN. As a result, Equation (23) may be modified as:

$$SNR_o = 2\beta N \times SNR_i, \quad (24)$$

wherein the processing gain of the proposed underlay channel decreases/increases with the bandwidth of transmission.

Probability of Misdetection and False Alarm

With the detector setup discussed above, the output of the detector after normalization with the constant term $E[h_i^H h_i]$ and taking the real part yields the following form:

$$\hat{b}_i = b_i + n_i \quad (25)$$

where $n_i$ is a real-valued Gaussian term with variance:

$$\sigma_{n_i}^2 = \frac{1}{SNR_o} = \frac{1}{2\beta N \times SNR_i} \quad (26)$$

When $b_i=0$ (i.e., no SR has been sent) $\hat{b}_i = n_i$, and for a correct detection that $b_i=0$, the real part of $n_i$ may be below a set threshold. On the other hand, when $b_i=1$ (i.e., an SR has been sent) $\hat{b}_i = 1+n_i$, and for a correct detection that $b_i=1$, the real part of $1+n_i$ may be above the same threshold.

Figure 12:
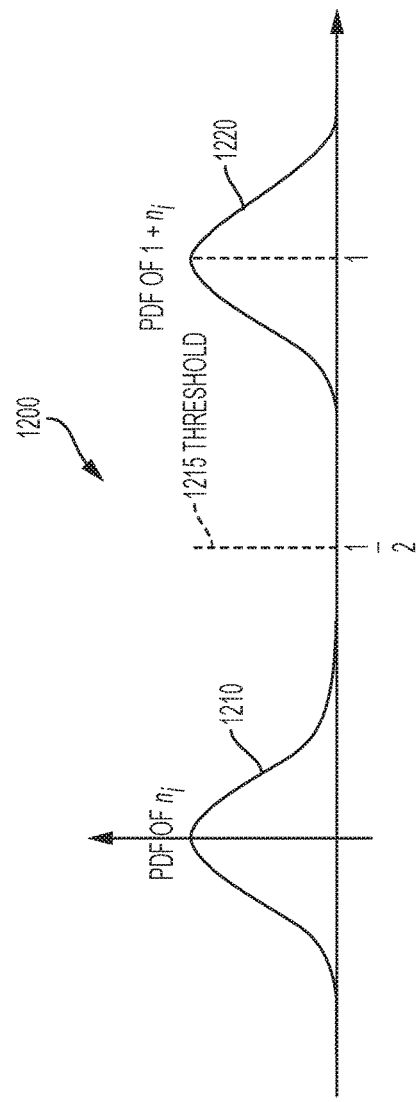
FIG. 12 is a graph illustrating the PDFs of $n_i$ and $1+n_i$ and the threshold value that minimizes both the probability of misdetection and false alarm.

FIG. 12 is a graph 1200 illustrating the probability distribution functions (PDFs) of $n_i$ (line 1210) and $1+n_i$ (line 1220) and the threshold value that minimizes both the probability of misdetection and false alarm. As shown in FIG. 12, setting a threshold (line 1215) at ½ minimizes both the probability of misdetection (i.e., detecting no SR when an SR has been sent) and the probability of false alarm (i.e., detecting an SR when no SR has been sent). Moreover, with the set threshold these two probabilities are equal. These two probabilities may be combined as one and called the bit-error-rate (BER).

With the above observations, the bit-error-rate (BER) may be calculated using the following:

$$BER = Q\left(\frac{1}{2\sigma_{n_i}}\right) \quad (27)$$

where $$Q(x) = \frac{1}{\sqrt{2\pi}} \int_x^\infty e^{-u^2/2} du.$$

To evaluate Equation (27) the Q-function may be replaced by the complementary error function, which results in:

$$BER = \frac{1}{2}\mathrm{erfc}\left(\frac{1}{2\sqrt{2}\,\sigma_{n_i}}\right) \quad (28)$$

Computer Simulations

Figure 13:
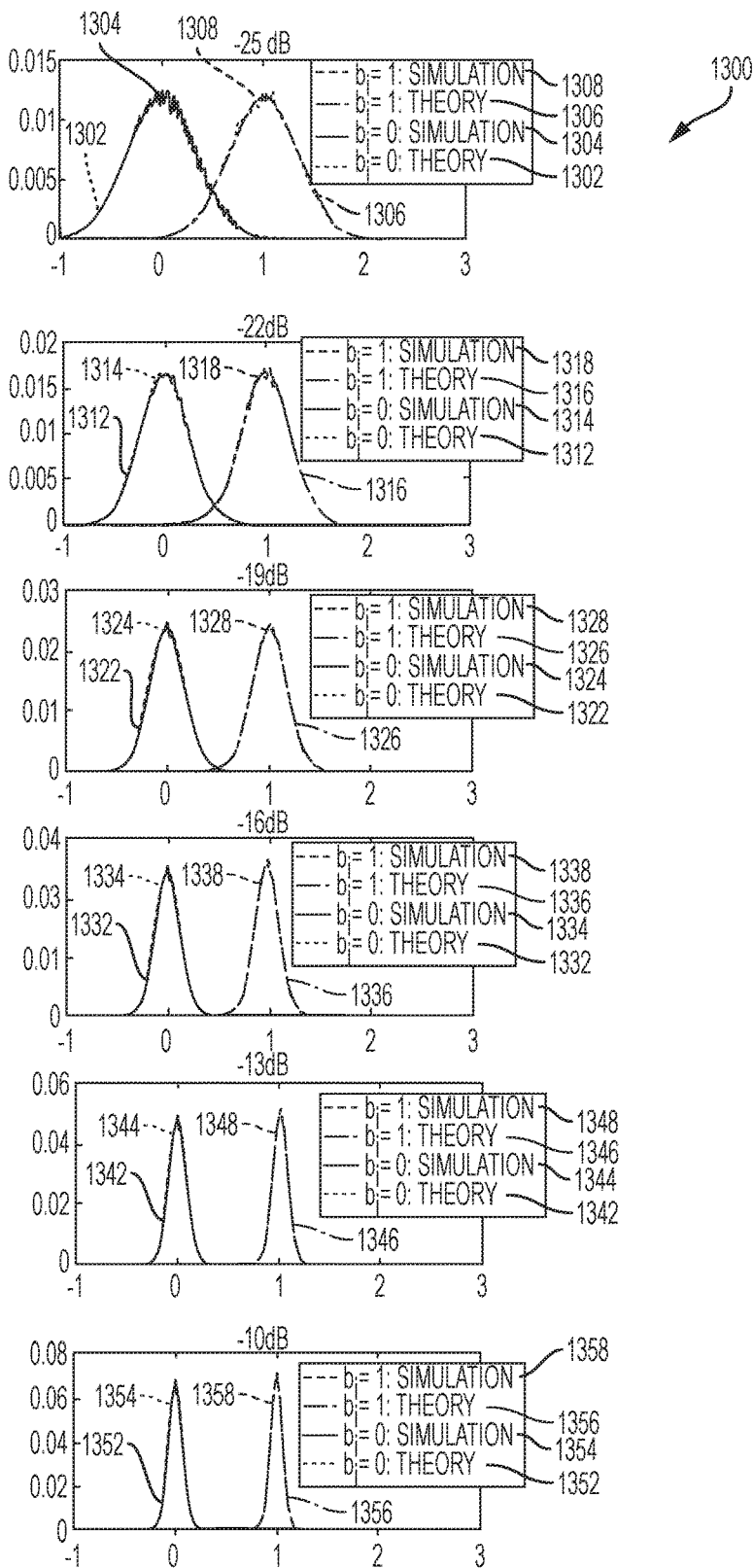
FIG. 13 are plots showing the probability distributions of the normalized detector output $\hat{b}_1$ for six choices of $SNR_{in}$.

FIG. 13 are plots 1300 showing the probability distributions of the normalized detector output $\hat{b}_i$ for six choices of $SNR_{in}$. The theoretical prediction curves that use Equation (28) for computation of the BER (lines 1302/1306, 1312/1316, 1322/1326, 1332/1336, 1342/1346, 1352/1356) in each case are compared with respective computer simulations (lines 1304/1308, 1314/1318, 1324/1328, 1334/1338, 1344/1348, 1354/1358) that show a substantial match between each comparison.

Figure 14:
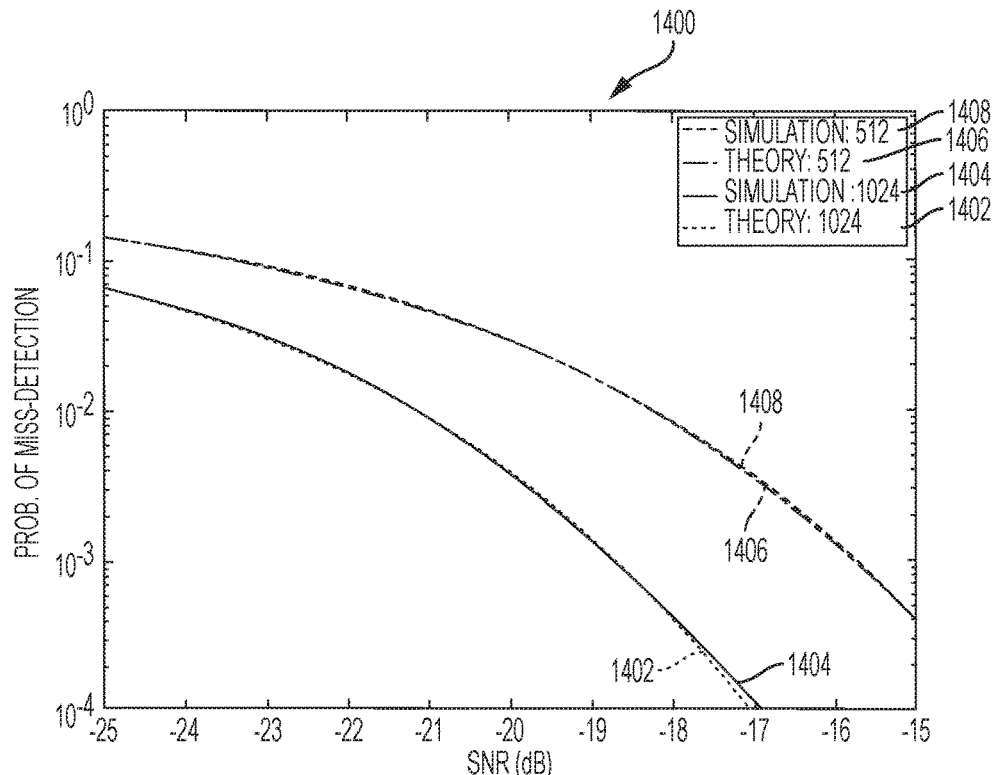
FIG. 14 is a plot showing BER curves that compare the theoretical and simulation results.

FIG. 14 is a plot 1400 showing BER curves 1402-1408 that compare the theoretical and simulation results. The results in FIG. 14 are presented for two choices of ZC sequence length (i) $N_1=1024$ and bandwidth 15 MHz; and (ii) $N_2=512$ and bandwidth 7.5 MHz. In some embodiments, zeros may be inserted between ZC-sequences samples to be expanded and match the FFT length of N=1024 and N=2048 for 10 MHz and 20 MHz channel bandwidth, respectively. Coincidentally, the plot 1400 also indicates the probability of false alarm. The number of simultaneous UEs that can be supported per symbol-duration depends upon the length of the ZC-sequence after expansion, N, and the length of CP.

Balancing Between the Probability of Correct Detection and False Alarm Rate

The threshold value that is shown in FIG. 12 may equalize the probability of a false alarm (i.e., detecting an ON bit when no bit has been transmitted) and the probability of a misdetection (i.e., not detecting an ON bit). To achieve a balance between these two probabilities may include moving the threshold line 1215 in FIG. 12 to the left or to the right. By moving the threshold line 1215 to the left the probability of false alarm increases while the probability of misdetection decreases. On the other hand, if the threshold line 1215 is shifted to the right, the probability of false alarm decreases while the probability of misdetection increases. Assuming, the variance of $n_i$ is known, setting the threshold line 1215 for a fixed false alarm rate, the probability of correct detection may improve as SNR increases.

ON/OFF Keying Continued: Receiver Implementation and Theoretical Results (CSI Unknown)

For the received signal given by Equation (17), it was assumed $x_i$ was known. This requires the knowledge of $h_i$, which is usually unavailable. Thus, it may be desirable to estimate the value of $b_i$ in the absence of a knowledge of $h_i$. The knowledge regarding $h_i$ may be limited to its length of L and possibly the fact that only a few of the elements of $h_i$ are significantly different from zero (i.e., $h_i$ is sparse). Under this condition, Equation (17) may be rewritten as:

$$x = b_i Z_i h_i + b_j x_j + n \tag{29}$$

In Equation (29), x and $Z_i$ may be known and that $Z_i^H x_j = 0$. Based on this knowledge, it may be desirable to determine the results if $b_i = 0$ or 1. To this end, a length L vector may be constructed as:

$$y_i = Z_i^H x$$

$$y_i = b_i h_i + n_i' \tag{30}$$

where $n_i' = Z_i^H n$.

At least some knowledge of the noise statistics may be required for a reasonable detector design that is able to detect of the value of $b_i$ from the vector $y_i$. In Equation (30), the vector $n_i'$ is a Gaussian vector (when n is a Gaussian noise) or, in general, may be approximated by a Gaussian vector. To make the development and analysis of the desired detector convenient, $n_i'$ may be assumed to be a Gaussian vector. Also, assuming that the elements of the vector n are uncorrelated with one another, the element of the vector $n_i'$ may also be uncorrelated. Hence, because $n_i'$ is assumed to be Gaussian, its statistics may be known if its variance could be estimated.

To allow estimation of the variance of the elements of $n_i'$ and detection of the presence or absence of an information bit, information bit b may be assumed to be transmitted twice, through two non-overlapping ZC sequences. Accordingly, instead of Equation (30), the following pair of equations are assumed to be available at the receiver:

$$\begin{cases} y_1 = bh + n_1' \\ y_2 = bh + n_2' \end{cases} \tag{31}$$

In Equation (31) the subscript "i" is removed from all the variables for brevity of the derivations that follow.

Noise Variance Estimation

In Equation (31), the noise vectors $n_1'$ and $n_2'$ are assumed to have the same statistics, but are independent of each other. With this assumption, to obtain an estimate of the variance $\sigma_n^2$ of the elements of these noise vectors, it is noted that:

$$\Delta y = y_1 - y_2 = n_1' - n_2' \tag{32}$$

and, accordingly, obtain:

$$\sigma_n^2 = \frac{(\Delta y)^H (\Delta y)}{2L} \tag{33}$$

where L is the length of $\Delta y$ (or, equivalently, the length of h) and the factor of 2 in the denominator of Equation (33) comes from the fact that each element of $\Delta y$ is a summation of two noise terms.

Embodiments of the disclosure may include detectors that take $y_1$, $y_2$, and $\sigma_n^2$ as inputs and generate a decision value b at its output. Three contemplated detectors are discussed below; however, additional detectors are also contemplated. The false alarm rate may be held constant for these detectors while letting the probability of misdetection to improve (e.g., decrease) as SNR increases.

First Detector

For the first detector, construction of the decision variable may include:

$$d_1 = \Re\{y_1^H y_2\} = bh^H h + \Re\{n_1'^H n_2' + bh^H n_2' + n_1'^H h\} \tag{34}$$

where $\Re\{x\}$ means the real part of x. Also, in some of the subsequent equations, $\Im\{x\}$ is used to denote the imaginary part of x.

When b=0, Equation (34) reduces to:

$$x = d_1|_{b=0} = \Re\{n_1'^H n_2'\}. \tag{35}$$

When a is known, a threshold $\eta$ may be selected that satisfies:

$$P(x > \eta) = p_{FA} \tag{36}$$

for a predetermined probability of false alarm, $p_{FA}$.

Derivation of an equation that enables Equation (36) to be solved for $\eta$ when $p_{FA}$ is specified leads to the following probability density function (PDF) for the random variable x that is defined in (35).

$$f_1(x) = \frac{\left(\frac{2|x|}{\sigma_n^2}\right)^{L-\frac{1}{2}} K_{L-\frac{1}{2}}\left(\frac{2|x|}{\sigma_n^2}\right)}{\frac{\sigma_n^2}{2} 2^{L-\frac{1}{2}} \pi^{\frac{1}{2}} \Gamma(L)} \tag{37}$$

where $\Gamma(\bullet)$ is the Gamma function and $K_a(\bullet)$ is the a-order modified Bessel function of second kind. For an integer argument L, $\Gamma(L) = L! = L(L-1)(L-2) \ldots 1$. The a-order modified Bessel function of second kind is expressed as:

$$K_a(x) = \frac{\pi}{2} \cdot \frac{I_{-a}(x) - I_a(x)}{\sin(a\pi)} \tag{38}$$

where $I_a(x)$ is the modified Bessel function of first kind, expressed as:

$$I_a(x) = \sum_{m=0}^{\infty} \frac{1}{m! \Gamma(m+a+1)} \left(\frac{x}{2}\right)^{2m+a} \tag{39}$$

Using Equation (37), for a given value of $p_{FA}$, the threshold $\eta$ is found by solving the following equation, for the unknown $\eta$:

$$1 - F_1(\eta) = p_{FA} \tag{40}$$

where:

$$F_1(\eta) = \int_{-\infty}^{\eta} f_1(x) dx \tag{41}$$

is the cumulative distribution function (CDF) of the random variable x.

Here, the solution to Equation (40) is found numerically, by first making a plot of $p_{FA} = 1 - F_1(\eta)$ as a function of $\eta$, from which for a given $p_{FA}$, the threshold $\eta$ can be found.

Second Detector

For the second detector, the averaged signal vector may be defined as:

$$y_3 = \frac{y_1 + y_2}{2} \tag{42}$$

This averaged vector $y_3$ may have the same form as $y_1$ and $y_2$, with 3 dB SNR improvement. The total energy of the averaged vector $y_3$ (i.e., the decision variable) may be evaluated as:

$$d_2 = y_3^H y_3 \tag{43}$$

and based on the result one may make a decision about the value of b. To this end, Equation (41) implies:

$$y_3 = bh + n_3' \quad (44)$$

$$\frac{\sigma_n^2}{2}$$

where $n'_3$ is a complex-valued Gaussian random vector with variance at each of its elements. When b=0, Equation (43) reduces to:

$$x = d_2|_{b=0} = \Re\{n_3'^H n_3'\}. \quad (45)$$

Here, x is a $\chi^2$ random variable with 2L degrees of freedom and, thus, with the PDF of:

$$f_2(x) = \frac{1}{\Gamma(L)\sigma_n^{2L}} x^{L-1} e^{-\frac{x}{\sigma_n^2}} \quad (46)$$

Next, starting with Equation (46), the threshold η can be found by making a plot of $p_{FA} = 1 - F_2(\eta)$ as a function of η, from which for a given $p_{FA}$, the threshold η can be found. Here:

$$F_2(\eta) = \int_{-\infty}^{\eta} f_2(x) dx \quad (47)$$

Third Detector

For the third detector, the impulse response h may be sparse and the magnitude of the real and imaginary parts of the impulse response h are significantly larger than $\sigma_n$ in the range of interest where the probability of misdetection is low. With this property of the impulse response h in mind, the following decision variables may be defined:

Type 1:

$$d_{3,1} = \max|z_1|, \ z_1 = \begin{bmatrix} \Re\{y_1\} \\ \Im\{y_1\} \\ \Re\{y_2\} \\ \Im\{y_2\} \end{bmatrix} \quad (48)$$

Type 2:

$$d_{3,2} = \max|z_2|, \ z_2 = \begin{bmatrix} \Re\{y_3\} \\ \Im\{y_3\} \end{bmatrix} \quad (49)$$

In Equation (48) and Equation (49), the absolute value operation |•| is applied to $z_1$ and $z_2$ elementwise.

For Type 1, when b=0, $z_1$ is a vector of length 4L with independent Gaussian entries, each with variance of $$\frac{\sigma_n^2}{2}.$$

Accordingly, for a given threshold is η:

$$p_{FA} = P(d_{3,1} > \eta | b = 0) = 1 - \left(\text{erf}\left(\frac{\eta}{\sigma_n}\right)\right)^{4L} \quad (50)$$

In Equation (50), the error function $$\text{erf}\left(\frac{\eta}{\sigma_n}\right)$$

is the probability of each of the elements of $z_1$ remain smaller than η. If all 4L elements of $z_1$ are smaller than η, there will be no false alarm, otherwise a false alarm happens, i.e., b=1 is detected, while b has been equal to zero.

For Type 2, when b=0, $z_2$ is a vector of length 2L with independent Gaussian entries, each with variance of $$\frac{\sigma_n^2}{4}.$$

Accordingly, for a given threshold η:

$$p_{FA} = P(d_{3,2} > \eta | b = 0) = 1 - \left(\text{erf}\left(\frac{\eta\sqrt{2}}{\sigma_n}\right)\right)^{2L} \quad (51)$$

Computer Simulations

Figure 15:
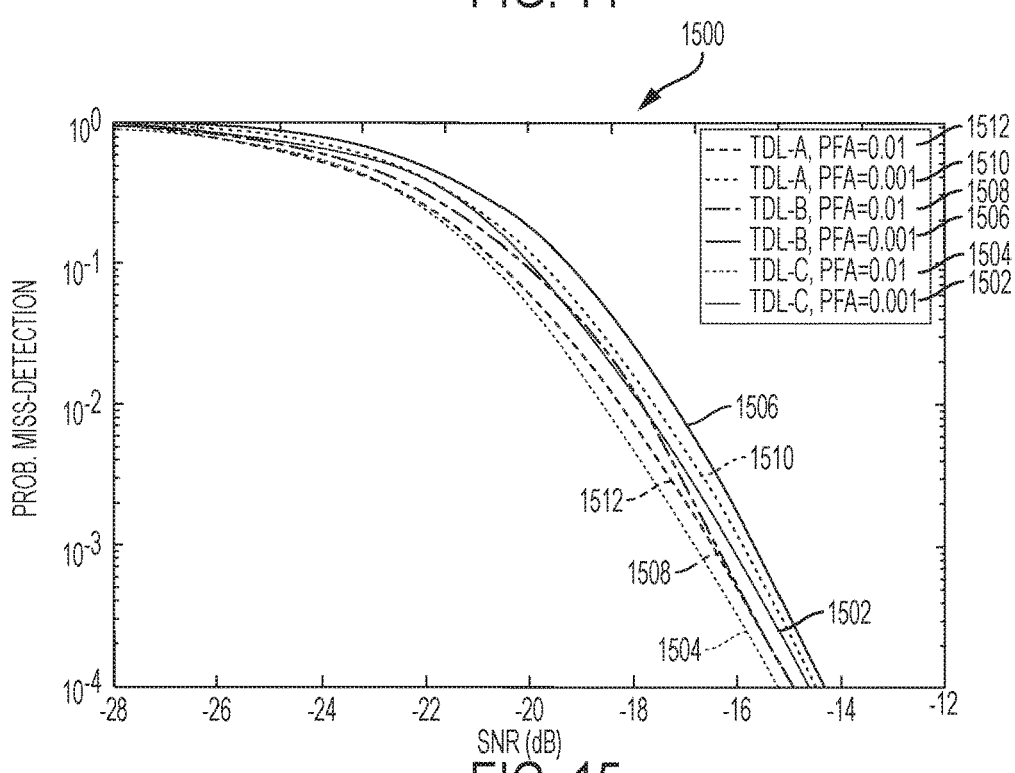
FIGS. 15 through 18 are plots showing curves for the probability of misdetection for the detectors according to various embodiments of the disclosure.
Figure 16:
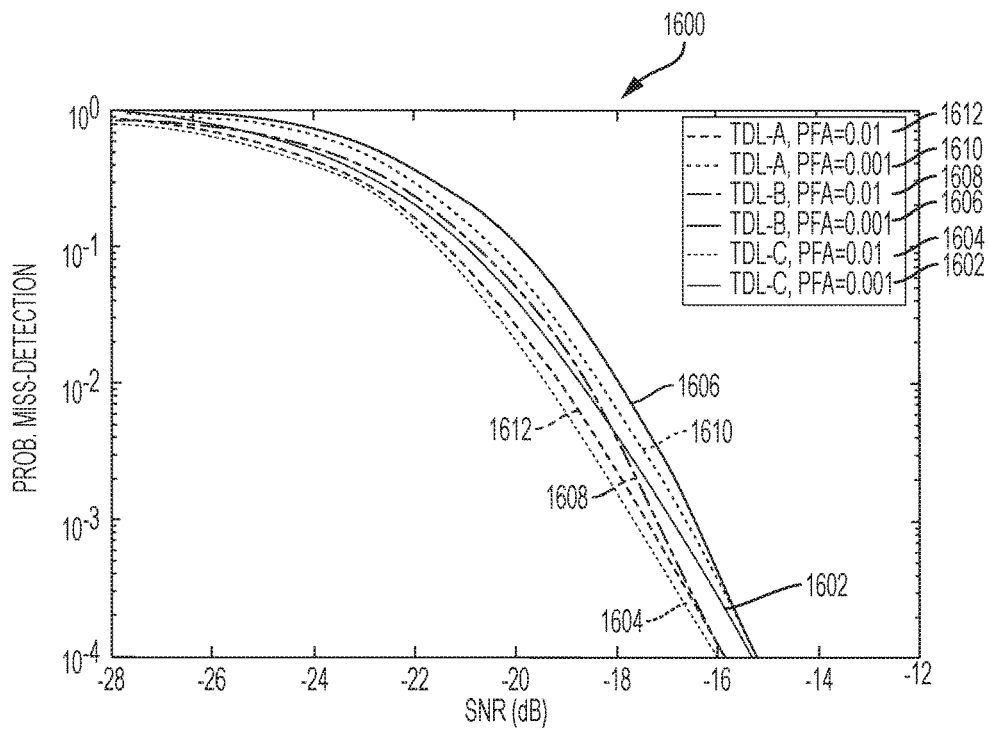
Figure 17:
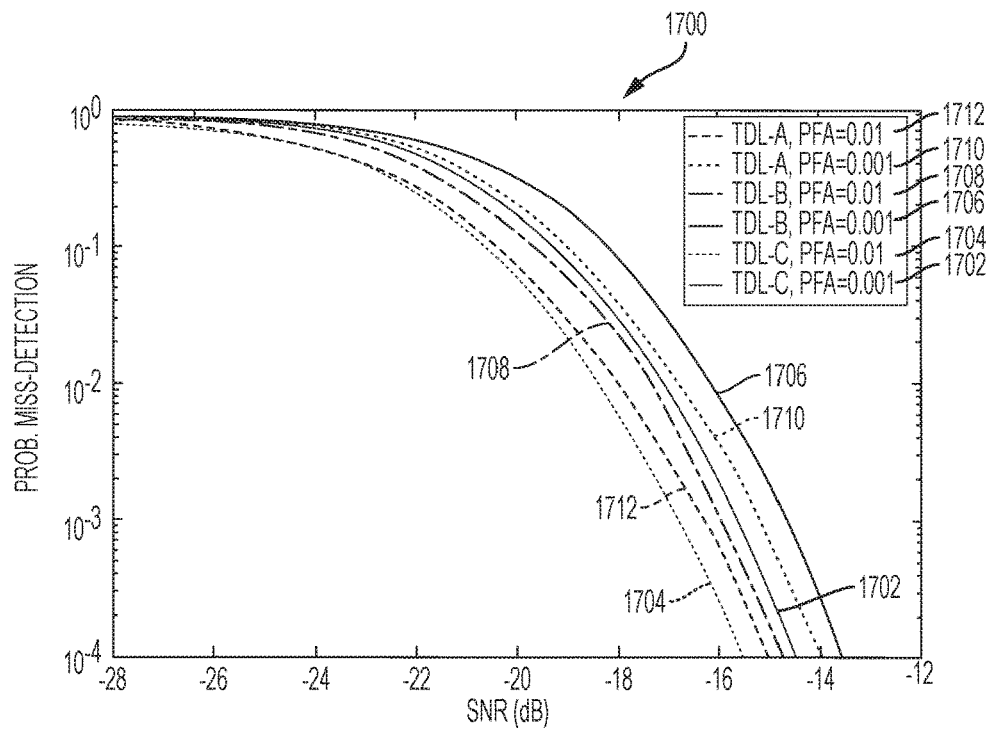
Figure 18:
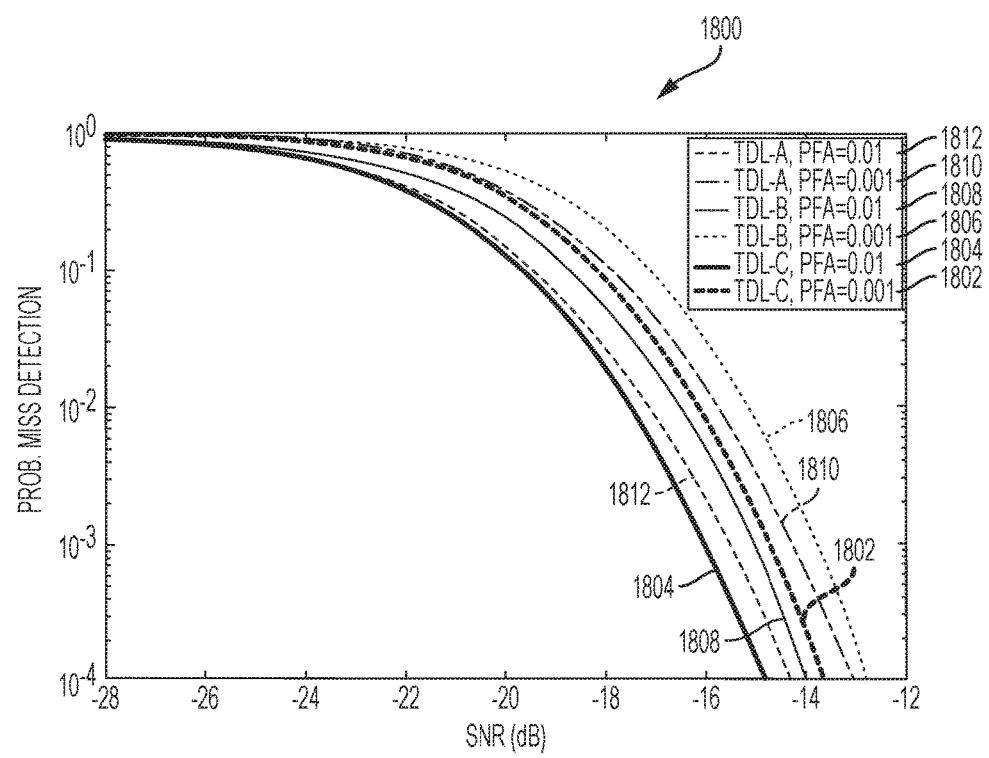

The above detectors for three different choices of the channel and two choice of $p_{FA}$=0.01 and 0.001 may be evaluated with respect to the results shown in FIGS. 15 through 18. The channels used are the TDL models A, B, and C that have been suggested by the 3GPP LTE group for future communications with carrier frequencies above 6 GHz. In particular, FIG. 15 is a plot 1500 showing curves 1502-1512 for the probability of misdetection for the first detector, FIG. 16 is a plot 1600 showing curves 1602-1612 for the probability of misdetection for the second detector, FIG. 17 is a plot 1700 showing curves 1702-1712 for the probability of misdetection for the third detector (Type 1), and FIG. 18 is a plot 1800 showing curves 1802-1812 for the probability of misdetection for the third detector (Type 2).

In FIGS. 15 through 18 the probability of misdetection refers to the case that a bit b=1 has been transmitted and the receiver has failed to detect the bit. The results are presented for two choices of $p_{FA}$=0.01 and 0.001. As seen the variation of the results with the change in channel and $p_{FA}$ is relatively small, particularly, for the first and the second detectors. For these detectors we see a variation of about 1 dB. For the third detector, this variation increases to about 2 dB. Moreover, the first detector and second detector show a superior performance over the third detector.

Beside the probability of misdetection, another consideration in selecting the detector may be the number of independent bits/UEs that a detector can serve over each ZC (or each OFDM) symbol duration. As discussed above, for a ZC sequence of length N and a channel duration L samples, M=N/L orthogonal bits may be transmitted over each ZC symbol duration. With repetition of each bit twice, it may appear that the number of orthogonal bits will be halved. While this may be the case, with a choice of a proper detector, the introduced interference may be tolerated if one of the repetitions of a pair of bits overlap. If such interference ignored, the number of orthogonal bits that can be transmitted over each ZC symbol duration may be $$\binom{M}{2} = \frac{M!}{(M-2)!2!} = \frac{M(M-1)}{2}.$$

In certain LTE scenarios, M=N/L may be as large as 50, hence, the number of independent bits that can be transmitted may be as large as $$\frac{50 \times 49}{2} = 1225$$

in such an example. As a non-limiting example, if 6 variations of SRs are allocated to each UE, such a set up can serve as many as 200 UEs in a cell. Among the three detectors discussed above, the first detector may introduce a minimum inter-bit interference.

ON/OFF Keying with Multiple Bits

The ON/OFF keying method discussed above transmits a signal (an SR) whose presence or absence is detected at the receiver (e.g., the base station of a cell). In some embodiments, the following modification can be applied to the generated SR signal such that multiple bits are transmitted per SR. An ON SR will consist of a reference bit $b_0=1$ and multiple bits that are transmitted over a set of non-overlapping ZC sequences. As a non-limiting example, two information bits $b_1$ and $b_2$ taking the values of ±1 may be transmitted. Under this condition, equation (31) extends to:

$$\begin{cases} y_0 = h + n'_0 \\ y_1 = b_1 h + n'_1 \\ y_2 = b_2 h + n'_2 \end{cases} \quad (52)$$

The first line of equation (52) is a reference signal and the next two lines are the information bit carriers. Following the first detector of the previous section, here, the presence of the SR is assumed if at least two of the following inequalities are held:

$$\begin{cases} |\mathbb{R}\{y_0^H y_1\}| > \eta \\ |\mathbb{R}\{y_0^H y_2\}| > \eta \\ |\mathbb{R}\{y_1^H y_2\}| > \eta \end{cases} \quad (53)$$

Other methods are contemplated to similarly detect the presence of the SR. Once the presence of the SR is detected, the estimates of the information bits are obtained as:

$$\begin{cases} \hat{b}_1 = \text{sgn}[\mathbb{R}\{y_0^H y_1\}] \\ \hat{b}_2 = \text{sgn}[\mathbb{R}\{y_0^H y_2\}] \end{cases} \quad (54)$$

where "sgn" refers to the signum of the indicated variable.

Embodiments of the disclosure may be extended to transmission of more than two bits of information should be apparent to one of ordinary skill in the art.

While the present disclosure has been described herein with respect to certain illustrated embodiments, those of ordinary skill in the art will recognize and appreciate that it is not so limited. Rather, many additions, deletions, and modifications to the illustrated embodiments may be made without departing from the scope of the disclosure as hereinafter claimed, including legal equivalents thereof. In addition, features from one embodiment may be combined with features of another embodiment while still being encompassed within the scope of the disclosure. Further, embodiments of the disclosure have utility with different and various detector types and configurations.

What is claimed is:

1. A user equipment device, comprising:
   at least one processor configured to:
   generate a scheduling request (SR) signal and transmit the SR signal to a base station via an underlay control channel below a noise level for a communication spectrum; and
   generate data packets and transmit the data packets to the base station over an overlay channel above the noise level for the communication spectrum, the user equipment device configured to transmit the SR signal to the base station via the underlay control channel while the user equipment device is also communicating with the base station via an active band overlay signal.

2. The user equipment device of claim 1, wherein the user equipment device is configured to not allow communication via the underlay control channel while receiving downlink control information from the base station.

3. The user equipment device of claim 1, wherein the user equipment device is configured to allow communication via the underlay control channel while transmitting uplink control information to the base station.

4. The user equipment device of claim 1, wherein the underlay control channel is a multiple access underlay control channel.

5. The user equipment device of claim 1, wherein the SR signal includes control information related to the data packets to be transmitted by the user equipment device, wherein the control information includes at least one of a buffer status, priority information, power-headroom, and combinations thereof.

6. A base station comprising at least one of one or more transmitters and one or more receivers configured to communicate uplink data and downlink data with one or more user equipments (UEs) using active sub-carriers of a spectrum, and simultaneously communicate scheduling requests with a user equipment (UE) of the one or more UEs using an underlay control channel below a noise level of the spectrum.

7. The base station of claim 6, wherein the scheduling requests are spread spectrum signals spread across the entire spectrum below the noise level.

8. The base station of claim 6, wherein the scheduling requests are spread spectrum signals spread below the noise level and across a portion of the spectrum within guard bands outside of the active sub-carriers.

9. The base station of claim 6, wherein the base station is configured to receive the scheduling requests from the UE without first assigning uplink or downlink resources to the UE.

10. The base station of claim 6, wherein the base station is configured to communicate the uplink data, the downlink data, and the scheduling requests with the user equipment within a time division duplex (TDD) network or a frequency division duplex (FDD) network.

11. The base station of claim 6, wherein the base station is further configured to generate and transmit paging messages to the user equipment using the underlay control channel.

12. A method comprising:
   sending a scheduling request from a user equipment to a base station via an underlay control channel below a noise level of a spectrum;

receiving the scheduling request by the base station; and transmitting a scheduling request grant from the base station to the user equipment, wherein receiving the scheduling request and transmitting the scheduling request are performed in parallel with other data communication between the base station and other user equipment.

13. The method of claim 12, wherein sending the other data communication between the base station and the other user equipment includes downlink data communication and/or uplink data communication between the base station and the other user equipment.

14. The method of claim 13, wherein the downlink data communication and/or the uplink data communication is transmitted over an overlay channel above the noise level for the spectrum.

15. The method of claim 12, further comprising:

receiving a plurality of different scheduling requests from different user equipment via the underlay control channel by the base station at different times; and transmitting scheduling request grants for each of the different scheduling requests to their respective user equipment.

16. The method of claim 12, wherein sending the scheduling request includes using an on/off keying technique configured to send information from the user equipment to the base station.

17. The method of claim 16, wherein each information bit sent from the user equipment to the base station includes a distinct spreading gain vector.

18. The method of claim 17, wherein the spreading gain vector includes a cyclic-shifted ZC-sequence as its spreading sequence.

19. The method of claim 16, wherein each scheduling request includes a reference bit and multiple bits over a set of non-overlapping ZC sequences per transmitted scheduling request.

* * * * *